United States Patent [19]
Appelberg

[11] Patent Number: 6,056,425
[45] Date of Patent: May 2, 2000

[54] ILLUMINATED ROOF MOUNTED SIGN ASSEMBLY FOR MOTOR VEHICLE

[75] Inventor: Mark J. Appelberg, Trumbull, Conn.

[73] Assignee: E-Lite Technologies, Inc., Trumbull, Conn.

[21] Appl. No.: 09/079,674

[22] Filed: May 15, 1998

[51] Int. Cl.[7] ............................ F21V 9/16; G09F 21/04
[52] U.S. Cl. ........................ 362/493; 362/84; 40/592
[58] Field of Search .......................... 362/84, 499, 510, 362/812; 40/591, 592, 611, 589

[56] References Cited

U.S. PATENT DOCUMENTS 3,284,938  11/1966  Diehl et al. ................................ 40/592
4,087,124   5/1978  Wiley ....................................... 40/592

*Primary Examiner*—Cassandra Spyrou
*Assistant Examiner*—Jared Treas
*Attorney, Agent, or Firm*—Ware, Fressola, Van der Sluys & Adolphson LLP

[57] ABSTRACT

An illuminated teardrop shaped sign mounted on the roof of a taxicab carries at least one transparency backlighted by an electroluminescent panel. Two separately backlighted transparencies may be employed, one for displaying an advertising message and the other carrying an emergency message to enable the cab driver to alert police if a criminal act is taking place in the cab.

20 Claims, 3 Drawing Sheets

6,056,425

ILLUMINATED ROOF MOUNTED SIGN ASSEMBLY FOR MOTOR VEHICLE

FIELD OF INVENTION

This invention relates in general to illuminated signs and deals more particularly with an improved backlighted sign for mounting on the roof of a motor vehicle.

BACKGROUND OF INVENTION

Back-lighted signs of the type with which the present invention is concerned are frequently mounted on the roofs of taxicabs and delivery vehicles to display advertising material. A typical roof mounted sign of the aforedescribed type generally includes a pair of horizontally elongated and laterally spaced apart translucent panels mounted at opposite sides of a supporting structure and backlighted by one or more incandescent bulbs or fluorescent lamps located between the panels. An illuminated sign of the aforedescribed type is normally visible from either side of the motor vehicle upon which it is mounted. However, such a sign is generally not readily visible when the vehicle is moving toward or away from the viewer. Further, the advertising display area provided by such a sign is usually somewhat limited.

The conventional bulbs, lamps, lamp fixtures, wiring and ballast required to maintain such signs in operation are somewhat fragile and easily damaged by road vibration. Consequently, such signs generally require frequent maintenance and part replacement with resulting downtime. Advertising contracts usually provide for downtime discount penalties which result in substantial reduction in advertising revenues when signs are out of service.

In recent years the high incidence of crime including taxicab highjackings, robberies and other crimes against cab drivers has caused at least one major U.S. municipality to adopt an ordinance requiring that taxicab companies equip each cab with an external warning display device to enable the driver of a cab to discreetly signal for police assistance if a crime is being committed within the cab or if the driver should happen to observe a crime in process in the neighborhood through which the cab is traveling. The present invention is concerned with the aforesaid problems.

Accordingly, it is the general aim of the present invention to provide an improved roof mounted, backlighted sign having increased display area, as compared with conventional signs of like kind, and which affords wide angle viewing of the sign from any viewing position relative to a vehicle upon which the sign is mounted. It is a further aim of the invention to provide a roof mounted motor vehicle sign having an improved backlighting system which provides a substantially uniform edge-to-edge illumination, free of "hot spots", and which is highly resistive to damage from road shock and vibration. Yet another aim of the invention is to provide an improved roof mounted advertising sign which may also serve as a warning device to enable a taxicab driver to discreetly signal for police assistance if a crime is being committed within his or her cab.

SUMMARY OF THE INVENTION

In accordance with the present invention, an illuminated sign mounted on the roof of a motor vehicle includes at least one elongated panel or strip of electroluminescent material having an electroluminescent surface, supporting means for maintaining the one strip of material in fixed position on the roof of the vehicle to form a substantially continuous horizontally disposed loop, the electroluminescent surface forming the outer surface of the loop, and retaining means for releasably securing at least one transparency in overlying relation to an associated portion of the electroluminescent surface. An attaching means is provided for securing the supporting means to the roof of the vehicle. An electrical circuit is provided for energizing the electroluminescent surface to backlight the transparency whereby material on the transparency may be viewed.

DETAILED DESCRIPTION OF PREFERRED EMBODIMENTS

Figure 1:
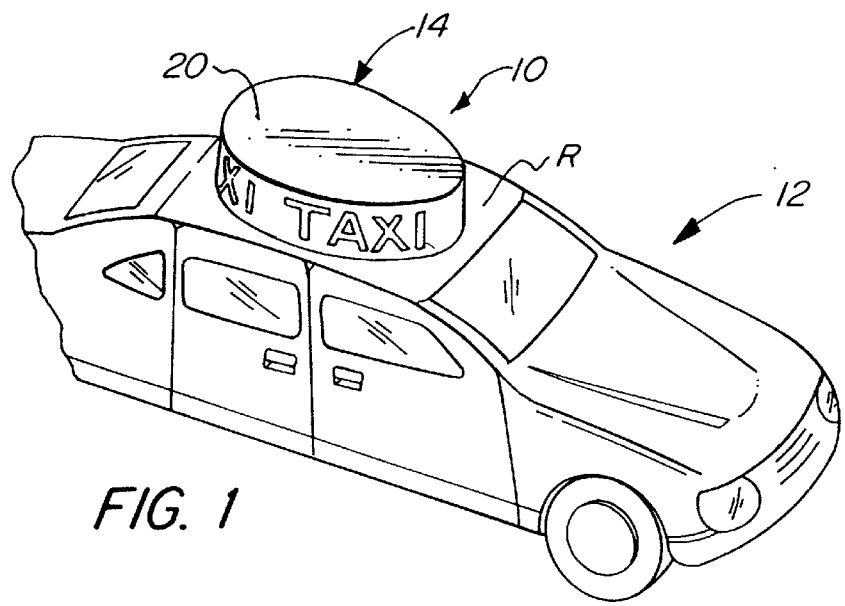
FIG. 1 is a fragmentary perspective view showing an illuminated sign assembly embodying the present invention mounted on the roof of a motor vehicle.

Turning now to the drawings, an illuminated sign assembly embodying the present invention and indicated generally by the reference numeral 10 is shown in FIG. 1 mounted on the roof of a taxicab designated generally by the numeral 12. The sign assembly 10 essentially comprises a support member indicated generally at 14, a mounting bracket 16 for attaching the support member 14 to the roof R of a motor vehicle, such as the cab 12, and a flexible electroluminescent panel 18, maintained in fixed position on the support member 14 for backlighting a transparency T carrying informational indicia, as, for example, an advertising message, or the like. The transparency T is releasably secured to the support member 14 in generally overlying relation to the electroluminescent panel 18. A typical sign carrying a transparency or advertising display panel bearing the word "TAXI" is shown in FIG. 1.

Figure 4:
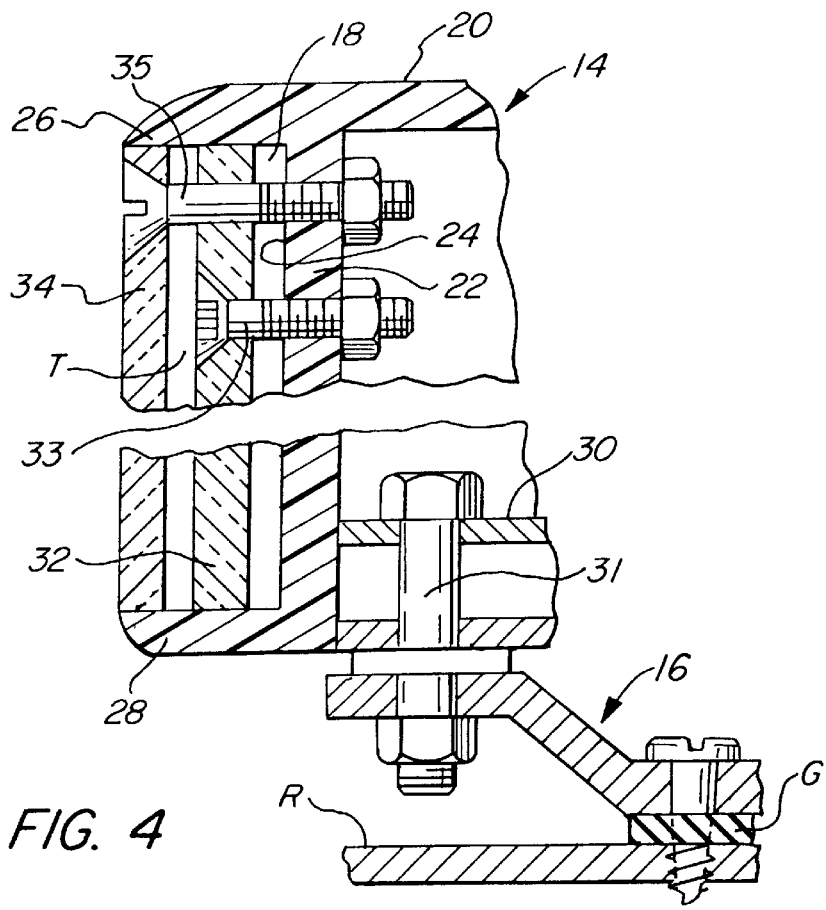
FIG. 4 is a somewhat enlarged fragmentary sectional view taken along the line 4—4 of FIG. 2.

Considering now the sign assembly 10 if further detail, the support member 14, as shown oriented in the drawings, essentially comprises a hollow downwardly open thin walled shell. The support shell may be made from any suitable material and may, for example, be fabricated from metal, such as aluminum, but preferably the sign support member or shell is molded or otherwise formed from a durable light weight dielectric plastic material or fabricated from a layup of resin impregnated fiberglass cloth. The support member 14, has a top wall 20 and an integral generally vertically disposed sidewall 22 which depends from the top wall. The sidewall has an outer peripheral surface 24 which forms a continuous or closed loop. The loop defined by the sidewall 24 has a substantially teardrop shaped horizontal cross-section, as viewed from above. The top wall 20 is substantially horizontally disposed and includes an annular upper flange 26 which projects outwardly in a horizontal direction from and beyond the sidewall outer surface 24, as best shown in FIG. 4. Preferably, and as shown, another annular flange 28 is integrally formed at the lower end of the sidewall and projects outwardly in a generally horizontal direction beyond the sidewall outer surface 24, substantially as shown in FIG. 4.

A rigid metal retaining and reinforcing frame or spider 30 is or may be mounted within the support member 14 to impart structural integrity to the support member, as may be required. Such supporting structure may be integrally formed with the shell during the shell manufacturing process. The illustrated frame 30 preferably carries three downwardly projecting fasteners 31, 31 (2 shown in FIG. 2) which are employed to releasably secure the support member 14 to the mounting bracket 16 so that the support member can be removed from the vehicle to which it is attached in the event that maintenance or repair should be necessary.

The electroluminescent panel or lamp 18 used in practicing the invention preferably comprises an elongated generally rectangular flexible panel disposed on the sidewall outer surface 24 and forming a substantially continuous loop complementing the teardrop configuration of the sidewall. Preferably, and as shown in the drawings, the electroluminescent panel extends between the upper and lower flanges 26 and 28 and substantially covers the entire sidewall outer surface 24 to provide substantially uniform edge-to-edge illumination. The opposite ends of the electroluminescent panel 18 are preferably clamped or otherwise secured to the support structure 14 in near abutting relating to each other so that the lamp panel 18 may be removed and replaced, when necessary. For a further disclosure of luminescent lamps of the type hereinbefore discussed, reference may be had to U.S. Pat. No. 5,045,755, issued Sep. 3, 1991, and U.S. Pat. No. 5,019,748, issued May 28, 1991 which are hereby adopted by reference as part of the present disclosure. The aforesaid U.S. patents are assigned to E-Lite Technologies, Inc., now of Stratford, Conn., assignee of the present invention.

Preferably, and as shown, an inner protective shield of light transmissible sheet material, indicated at 32 is arranged in overlying relation to the electroluminescent lamp 18 and covers the entire outwardly facing electroluminescent surface of the lamp forming a loop generally complementing the teardrop shaped configuration of the sidewall 22. The inner shield 32 is preferably formed from two or more shield sections assembled in abutting end-to-end relation to each other on the support member 14 and may be made from any suitable light transmittable material, but preferably, impact resistant polycarbonate is employed for this purpose. The inner shield is preferably secured to the support member 14 for removal only when it becomes necessary to remove and replace or otherwise service the panel lamp 18. Threaded fasteners 33,33 (one shown) engageable with captive nuts secured to the support member 14 may be employed for fastening the inner shield or shield sections to the support member to discourage removal by persons other than those qualified to service the lamp 18. Fasteners headed to require a special tool for removal are presently preferred for this purpose.

Figure 3:
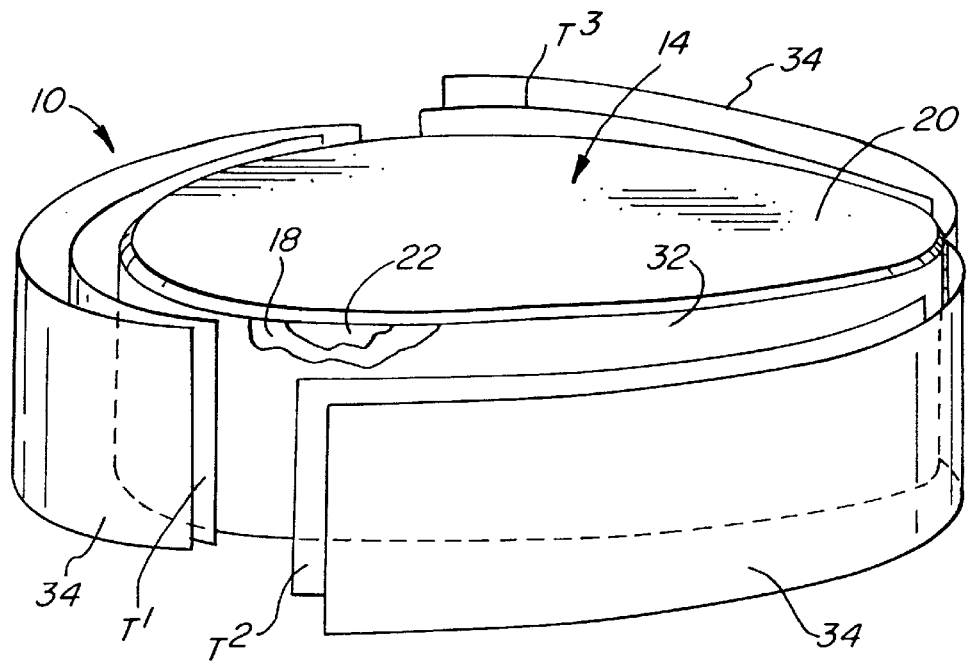
FIG. 3 is a further enlarged exploded somewhat schematic perspective view of the sign assembly.

At least one transparency for displaying advertising material or other messages is releasably retained in overlying relation to the inner protective shield 32 and the illuminescent lamp 18 thereunder by an outer protective shield 34 which overlies and forms a complementary loop about the entire inner protective shield 32. The illustrated sign 10 carries three such transparencies T1, T2 and T3. The transparencies T1–T3 are disposed between the inner and outer protective shields 32 and 34 as best shown in FIGS. 3 and 4. The outer protective shield 34 is releasably retained on the support member 14 so that it may be readily released for limited separation, if not entire removal, from the support member 14 to enable removal and replacement of the transparency or transparencies when it is desired to change the sign message.

As shown in FIG. 3, the outer protective shield on the illustrated sign assembly 10 is formed by three shield section assembled in abutting end-to-end relation to each other and releasably secured to the support member 14 by a hinge and threaded fasteners 35, 35 (one shown in FIG. 3) that extend through the wall of the structure and threadably engage captive nuts secured to the inner surface of the sidewall 22 within the interior of the hollow shell 14. The aforesaid arrangement for releasably retaining the advertising message on the support member 14 is merely intended to illustrate an example of a retention means which may be employed, since other types of releasably retention device, such as quick release latches are contemplated within the scope of the invention.

The outer protective shield 34 is made from a light transmissible sheet material and may be either transparent or translucent, polycarbonate being the presently preferred material. When it is desired that the sign be visible at all times, both in its lighted and unlighted condition, a transparent outer protective shield will be employed. However, there may be instances when the message is intended to be seen only when the sign is illuminated. In this instance, a translucent outer protective shield may be employed.

Figure 2:
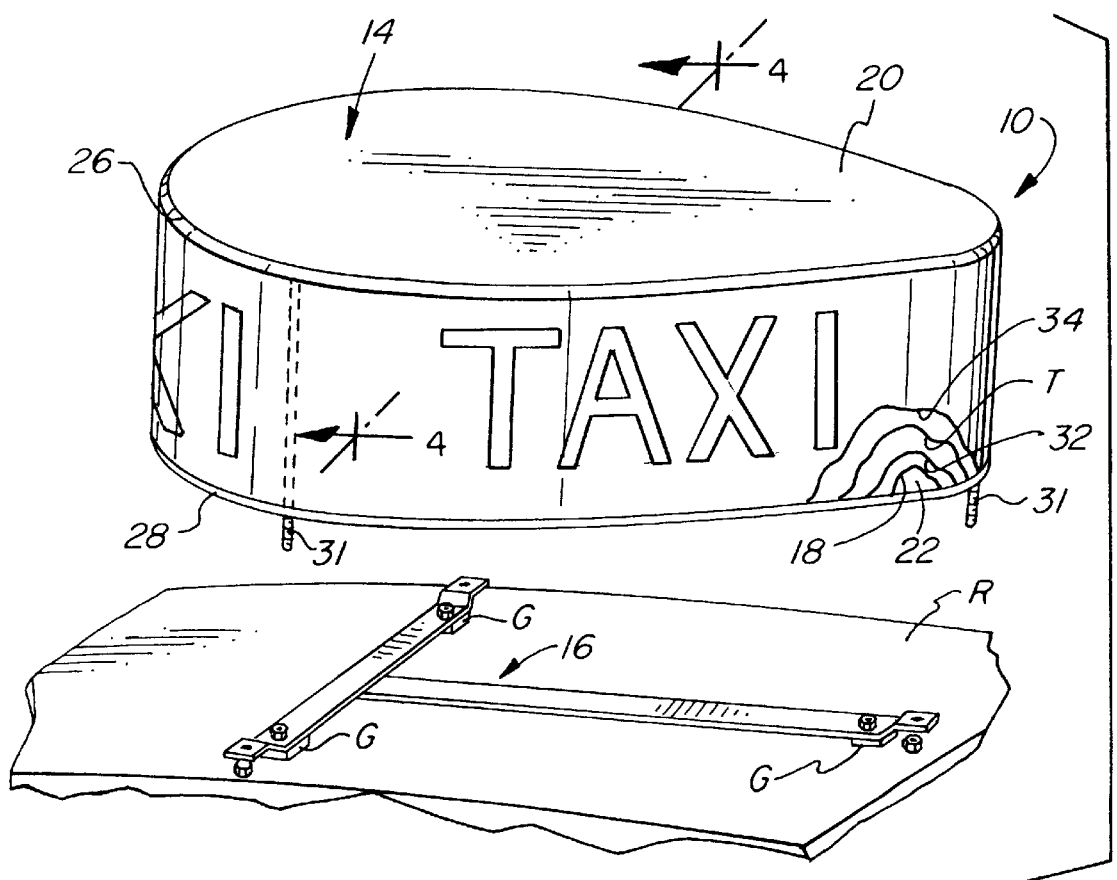
FIG. 2 is somewhat enlarge exploded perspective view showing the sign and mounting bracket.

The mounting bracket for attaching the support member 14 to the roof of an associated motor vehicle is best shown in FIG. 2. The presently preferred mounting bracket 16 comprises a generally T-shaped metal mounting member having apertured end portions for receiving threaded fasteners carried by the support member. The mounting bracket may, for example, be secured to the roof of an associated vehicle, such as the vehicle 12 by threaded fasteners which extend through the roof of the vehicle to engage captive nuts on the underside of the roof or by sheet metal screws, as shown in FIG. 4. Gaskets G, G are located between the mounting member 16 and the vehicle roof R, substantially as shown, to prevent roof leakage.

Power for operating the electroluminescent 18 is provided by the electrical system of the motor vehicle 12. The various electrical components including the inverter X (FIG. 5), which comprises a part of the electrical system for operating the lamp 18, are preferably contained within the interior of the vehicle, as, for example within the trunk compartment, for protection against weather, to allow easy access for service, and to minimize risk of damage from vibration and road shock. If desired, the electrical circuit for operating the electroluminescent panel may be connected to the power source through a conventional manually-operated headlight switch or a photoelectric sensing device which operates the vehicle headlights during hours of darkness so that the advertising message carried by the sign will be illuminated whenever the vehicle headlights are in use.

The support member or shell 14 is open at its lower end so that rainwater or water used in cleaning the vehicle will not collect within the sign structure. The flange 26 at the upper end of the sign is arranged to shed water and thereby prevent water from entering the spaces between the inner and outer protective shields or between the inner shield and the sidewall of the support member 14. The teardrop shape configuration of the sign enables maximization of advertising display area while retaining a pleasing overall sign appearance. A conventional illuminated motor vehicle roof sign of the type presently in widespread use carries two transparencies of a standard size, whereas the sign of the present invention carries three such standard transparencies.

Figure 5:
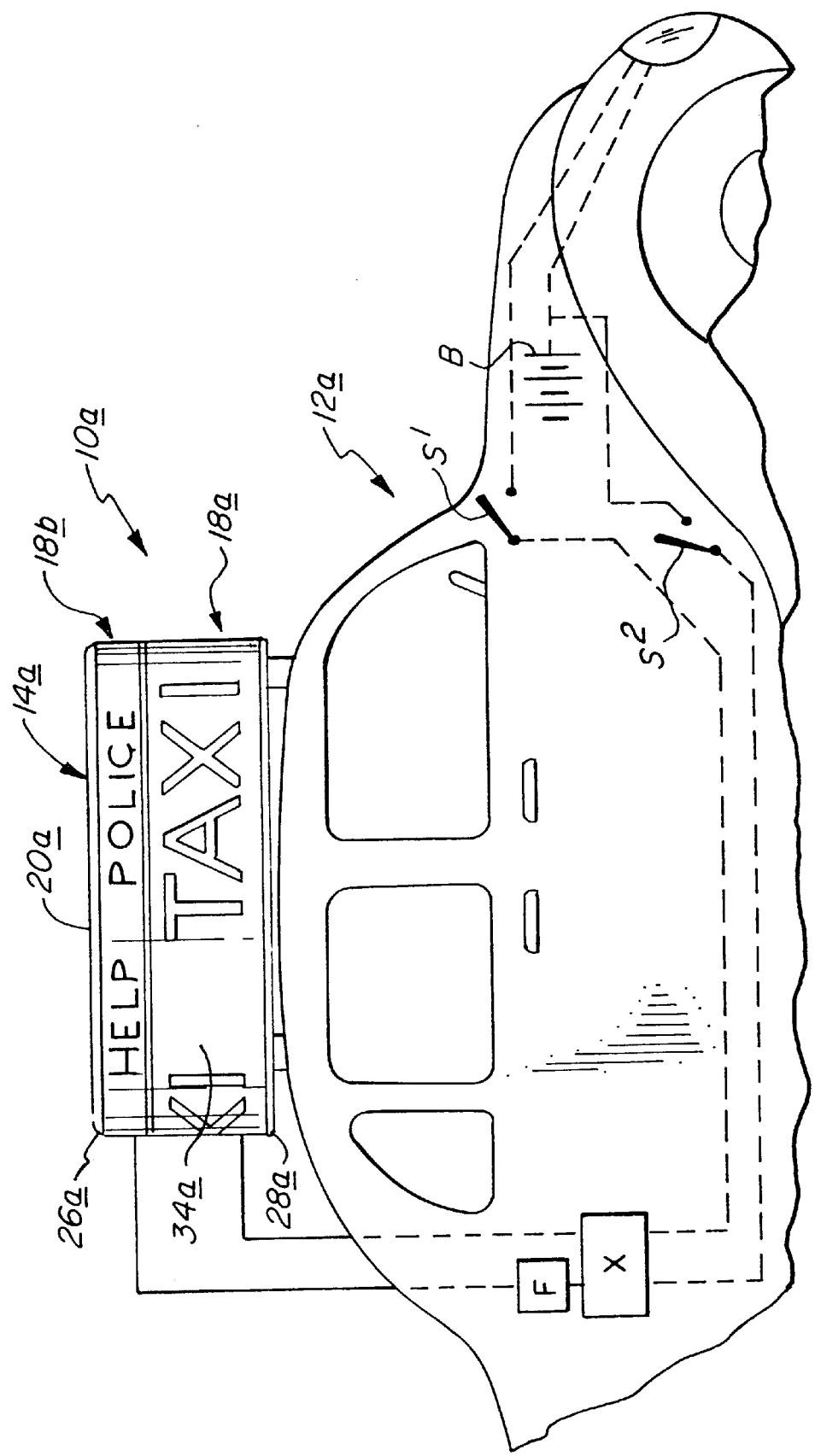
FIG. 5 is a somewhat schematic side elevational view illustrating another embodiment of the invention.

Further referring to the drawings and particularly to FIG. 5, there is shown another electroluminescent roof mounted motor vehicle sign assembly indicated generally at 10a and mounted on the roof of a vehicle 12a. The illustrated sign assembly 10a is similar in most respects to the sign assembly 10, previously described, and parts identical to previously described parts bear the same reference numeral and a letter a or b suffix and will not be hereinafter discussed in detail.

The sign assembly 10a differs from the sign assembly 10 in that it has two separate and distinct electroluminescent panels indicated at 18a, 18b. The panel 18a which extends along the lower portion of the support member 14a is of substantially greater vertical width than the panel 18b located above it. Preferably, the electroluminescent panels 18a and 18b are separately energized and include separate switching circuits connected to a common battery operated power supply B so that the panels may be selectively energized. Thus, one of the panels may be energized or, if desired, both panels may be simultaneously energized by separately operated switches indicated at $S^1$ and $S^2$. The switch $S^1$ is also arranged to operate the vehicle headlights. The panel 18a may, for example, serve as an advertising display panel while the panel 18b may be employed as an emergency signaling device, when required. Since the two electroluminescent panels are arranged for separate operation, the electrical circuit serving the emergency signal panel may include a flasher F, if not prohibited by local ordinance. Thus, the message carried by the signal panel will be flashed on and off to attract maximum attention. The switch $S^2$ for operating the emergency signal circuit will, of course, be located at a position within the vehicle where it can be discretely operated by the driver of the vehicle if a criminal act is taking place within the vehicle.

The illustrated sign 10a may be arranged with a translucent outer protective shield covering either or both of the messages backlighted by the panels 18a and 18b. Thus, for example, the panel 18a displaying an advertising message may be releasably retained in position on the support member 14a by a transparent outer shield so that the message is visible at all times, whereas the translucency which carries the emergency signal message may be arranged so that the message is visible only when the associated emergency message circuit is energized.

I claim:

1. The combination comprising a motor vehicle having a roof and an illuminated roof sign, said sign including at least one axially elongated strip of electroluminescent material having an electroluminescent surface, supporting means for maintaining said strip of material in fixed position forming a substantially continuous axially horizontal loop with said electroluminescent surface forming the outer surface of said loop, retaining means for releasably securing at least one transparency in overlying relation to an associated portion of said electroluminescent surface, attaching means for securing said supporting means to the roof of said motor vehicle, and electrical circuit means carried by said motor vehicle for energizing said electroluminescent surface to backlight said transparency whereby material on the transparency may be viewed.

2. The combination as set forth in claim 1 wherein said loop has a generally teardrop shaped horizontal cross-section.

3. The combination as set forth in claim 1 wherein said sign includes a first protective shield of light transmissible sheet material secured to said supporting means in overlying engagement with said electroluminescent surface and the at least one transparency is releasably secured in overlying relation to said first protective shield by said retaining means.

4. The combination as set forth in claim 3 wherein said first protective shield is transparent.

5. The combination as set forth in claim 3 wherein said first protective shield is translucent.

6. The combination as set forth in claim 3 wherein said retaining means comprises a second protective shield of light transmissible sheet material and means for releasably securing said second protective shield in overlying relation to said at least one transparency.

7. The combination as set forth in claim 6 wherein said second protective shield is transparent.

8. The combination as set forth in claim 6 where said second protective shield is translucent.

9. The combination as set forth in claim 1 wherein said supporting mans comprises a hollow downwardly open shell formed form dielectric material and having a generally horizontally disposed top wall and a generally vertically disposed sidewall depending from said top wall and said strip is supported in fixed position on said sidewall.

10. The combination as set forth in claim 9 wherein said shell has an annular flange projecting generally horizontally outwardly beyond the upper end of said sidewall.

11. The combination as set forth in claim 1 wherein said attaching means comprises a mounting bracket secured to said roof and said supporting means is releasably secured to said mounting means.

12. The combination as set forth in claim 1 wherein said electrical circuit means comprises a plurality of circuit components and said circuit components are located within said motor vehicle.

13. The combination as set forth in claim 1 wherein said electrical circuit means is activated in response to operation of the headlights on said motor vehicle to energize said electroluminescent surface.

14. The combination as set forth in claim 1 wherein said sign includes two generally parallel strips of electroluminescent material maintained in axially parallel spaced apart relation to each other.

15. The combination as set forth in claim 14 wherein said electrical circuit means includes means for selectively and independently energizing said electroluminescent surface of each strip.

16. An illuminated motor vehicle roof sign comprising a hollow substantially rigid downwardly open shell formed from dielectric material and having a generally horizontally disposed top wall and a generally vertically disposed sidewall depending from said top wall, wherein said sidewall has an outer peripheral surface and said shell has a substantially teardrop shaped horizontal cross-sectional configuration, and electroluminescent panel disposed in overlying relation with at least a portion of the outer peripheral surface of said sidewall, a first protective shield of light-transmissible sheet material secured to said shell in overlying relation to said electroluminescent panel and maintaining said panel in overlying engagement with said outer surface of said sidewall, retaining means for releasably securing a transparency in overlying engagement with said first protective shield, attaching means for securing said shell to the roof of a motor vehicle, and electrical circuit means for energizing said electroluminescent panel to backlight said transparency whereby material on the transparency may be viewed, and wherein said retaining means comprises a second protective shield and means to releasably securing said second protective shield in overlying relation to the transparency.

17. An illuminated motor vehicle sign as set forth in claim 16 wherein said second protective shield is formed by a plurality of individual shield sections.

18. An illuminated motor vehicle roof sign as set forth in claim 16 wherein said second protective shield is formed from polycarbonate.

19. An illuminated motor vehicle roof sign as set forth in claim 16 wherein said second protective shield is transparent.

20. An illuminated motor vehicle roof sign as set forth in claim 16 wherein said second protective shield is translucent.

* * * * *